(12) United States Patent
Harding et al.

(10) Patent No.: US 8,206,810 B1
(45) Date of Patent: *Jun. 26, 2012

(54) HIGH MODULUS ULTRA HIGH MOLECULAR WEIGHT POLYETHYLENE TAPE

(75) Inventors: Kenneth C. Harding, Midlothian, VA (US); Joseph Evan Mitchell, Concord, NC (US); Wesley B. Petrea, Kannapolis, NC (US)

(73) Assignee: Bae Systems Tensylon H. P. M., Inc., Monroe, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 13/374,118

(22) Filed: Dec. 12, 2011

Related U.S. Application Data

(63) Continuation-in-part of application No. 13/135,536, filed on Jul. 8, 2011, now Pat. No. 8,075,979, which is a continuation of application No. 11/821,659, filed on Jun. 25, 2007, now Pat. No. 7,976,930, application No. 13/374,118, which is a continuation-in-part of application No. 12/928,603, filed on Dec. 15, 2010, now Pat. No. 8,137,601, which is a continuation of application No. 12/287,799, filed on Oct. 14, 2008, now Pat. No. 7,858,004, which is a continuation-in-part of application No. 12/080,197, filed on Apr. 1, 2008, now Pat. No. 7,854,870.

(51) Int. Cl.
*B29C 65/00* (2006.01)
*B32B 37/10* (2006.01)
*B32B 37/22* (2006.01)

(52) U.S. Cl. ............... 428/156; 139/383 R; 156/164; 156/194; 156/304.6; 428/107; 428/213; 428/364; 442/135

(58) Field of Classification Search ............... 428/156, 428/107, 213, 364; 139/383 R; 156/164, 156/304.6; 442/135
See application file for complete search history.

(56) References Cited

U.S. PATENT DOCUMENTS
6,951,685 B1 * 10/2005 Weedon et al. ............... 428/364

FOREIGN PATENT DOCUMENTS
EP 1627719 A1 * 2/2006
* cited by examiner

*Primary Examiner* — Brent Ohern

(57) ABSTRACT

A non-fibrous, high tenacity, highly oriented UHMWPE tape or sheet of high molecular weight having a substantially large aspect ratio, a high tenacity, and a substantially higher tensile modulus. The UHMWPE tape includes an average molecular weight of 2,000,000 or greater, a width of ½-inch or greater, a thickness of between 0.0008 and 0.004 inch, and a modulus of between 1600 and 2500 grams per denier.

11 Claims, 3 Drawing Sheets

HIGH MODULUS ULTRA HIGH MOLECULAR WEIGHT POLYETHYLENE TAPE

This application is a continuation-in-part of U.S. patent application Ser. No. 13/135,536 filed Jul. 8, 2011 and now U.S. Pat. No. 8,075,979, which is a continuation of U.S. patent application Ser. No. 11/821,659 filed Jun. 25, 2007 and now U.S. Pat. No. 7,976,930, this application is also a continuation-in-part of U.S. patent application Ser. No. 12/928, 603 filed Dec. 15, 2010 and now U.S. Pat. No. 8,137,601, which is a continuation of U.S. patent application Ser. No. 12/287,799 filed Oct. 14, 2008 and now U.S. Pat. No. 7,858, 004, which is a continuation-in-part of U.S. patent application Ser. No. 12/080,197 filed Apr. 1, 2008 and now U.S. Pat. No. 7,854,870, all of which applications and patents the contents are incorporated herein by reference in their entirety.

FIELD OF THE INVENTION

The present invention relates to ultra high molecular weight polyethylene (UHMWPE) and more particularly to a novel high tenacity and high modulus UHMWPE tape useful for various high-strength applications such as the fabrication of ballistic-resistant articles, panels, and, when slit to narrow widths, high performance applications such as tensile members in sail cloth, ropes, slings, and nets.

BACKGROUND OF THE INVENTION

In U.S. patent application Ser. No. 12/928,603, filed on Dec. 15, 2010 and entitled "Method and Apparatus for the Production of High Tenacity Polyolefin Sheet", there was presented a "direct roll" process for the production of a coherent virtually fully dense polyolefin sheet suitable for further processing by drawing to produce a high tenacity, highly oriented film, tape, fiber, ribbon, or sheet from a polyolefin powder. The direct roll process disclosed therein included feeding a metered amount of polyolefin powder into the nip between two heated calender rolls and rolling the powder through the nip under these conditions until a coherent sheet of polyolefin was produced. The direct roll process eliminated the need for compacting the polyolefin powder with a separate and costly compaction step common to the prior art, which required substantially complex and costly compaction equipment. The preferred polyolefin in the direct roll process was ultra high molecular weight polyethylene (UHMWPE), which formed a non-fibrous, monolithic, high tenacity, ultra high molecular weight polyethylene tape product suitable for use in high strength applications such as ballistic resistant articles or panels. The tape product of the present invention can be slit into narrow widths below ½" for use in applications such as rope, netting, and sails.

Although the aforementioned patent application adequately provided a high strength tape product for use as the high modulus component in ballistic-resistant products, unexpected beneficial results have recently been obtained with the direct roll process. It has been found that additional improvements in the direct roll process yield UHMWPE tapes with a substantially higher tensile modulus in the range of 1600 to 2500 grams/denier. Such a higher modulus range translates into articles or panels with superior ballistic resistance, or, when slit into narrower widths, into higher modulus tensile members in sail cloth, ropes, slings, or nets. Additionally, processing UHMWPE tapes or sheets into ballistic-resistant products is substantially easier and less costly than processing UHMWPE fibers into ballistic-resistant products.

A resin matrix is commonly used to bind multifilament fibers with parallel alignment into uni-directional web products often called uni-tape. The non-fibrous tape of the previous and current invention is already a web with a very high degree of orientation and contains 100% of the critical polymer useful for ballistic protection and none of the binding matrix. A binding matrix can be added between layers and further consolidated into ballistic articles by heat and pressure. Regardless, the total percentage of non-ballistic material in the form of a binding matrix is much smaller for the tape of this invention, offering improved performance.

Current methods of production of high modulus UHMWPE include the gel-spinning technique, a well known method capable of producing multi-filament fibers or bundles of very small monofilaments as described in U.S. Pat. No. 4,551,296. These fibers are produced by various manufacturers including DSM High Performance Fibers in the Netherlands under the trade name Dyneema and by Honeywell in the USA under the trade name Spectra. The molecules of UHMWPE are first dissolved in a suitable solvent to help untangle the molecules and isolate individual chain molecules and the resulting solution, or gel, is spun through a spinneret, the solvent removed, and the resulting fiber, with low-entanglements, is drawn to provide high modulus and tenacity. Because a spinneret is used to produce this material, the denier per filament for the high modulus material after drawing is very low, typically less than 10 denier per filament (dpf) and often less than 1 dpf. The aspect ratio is also small since these fibers are nearly round with an aspect ratio approaching 1:1 in the cross direction. Higher aspect ratios can be produced but the typical aspect ratio is under 10:1. Some differences in manufacturing gel-spun products versus the production of high modulus non-fibrous tape via rolling and drawing according to this invention is a) the use of a solution to dissolve the polymer prior to spinning versus the absence of solvent and no dissolving of polymer in the present invention, b) the formation of small monofilaments with small aspect ratios that are bundled together to form multi-filament fibers compared to the monolithic, homogenous, rectangular shaped tape product produced in this art with an aspect ratio well above 10:1, c) the molecular weight of the gel-spun fibrous product is typically much lower than the molecular weight of the starting gel-spun polymer whereas the tape product of the present invention has the same molecular weight as the starting polymer, d) undesirable small traces of solvent remain in the finished gel-spun product whereas no solvent is used or retained in the tape product of the present invention, e) gel-spun product exhibits high creep values whereas the tape product of the present invention exhibits very low creep, f) gel-spun PE products are known for their high abrasion and cut resistance but the abrasion resistance of the tape product of the present invention exhibits even higher abrasion and cut resistance owing to its monolithic homogenous nature and higher molecular weight, and g) the manufacturing costs and complexity are significantly lower for the tape product of the present invention as the equipment is less capital intensive to buy and install and simpler to operate and there is no use or consumption of solvent during the manufacturing process.

OBJECT OF THE INVENTION

It is therefore an object of the present invention to provide a non-fibrous, high tenacity, highly oriented UHMWPE tape or sheet of high molecular weight having a substantially large aspect ratio, a high tenacity, and a substantially higher tensile modulus than has been produced in prior art UHWMPE tapes.

SUMMARY OF THE INVENTION

According to the present invention, there is provided a non-fibrous, high tenacity, highly oriented UHMWPE tape or sheet of high molecular weight having a substantially large aspect ratio, a high tenacity, and a substantially higher tensile modulus. The UHMWPE tape includes an average molecular weight of 2,000,000 or greater, a width of ½-inch or greater, a thickness of between 0.0008 and 0.004 inch, and a modulus of between 1600 and 2500 grams per denier.

DETAILED DESCRIPTION OF THE INVENTION

Figure 1:
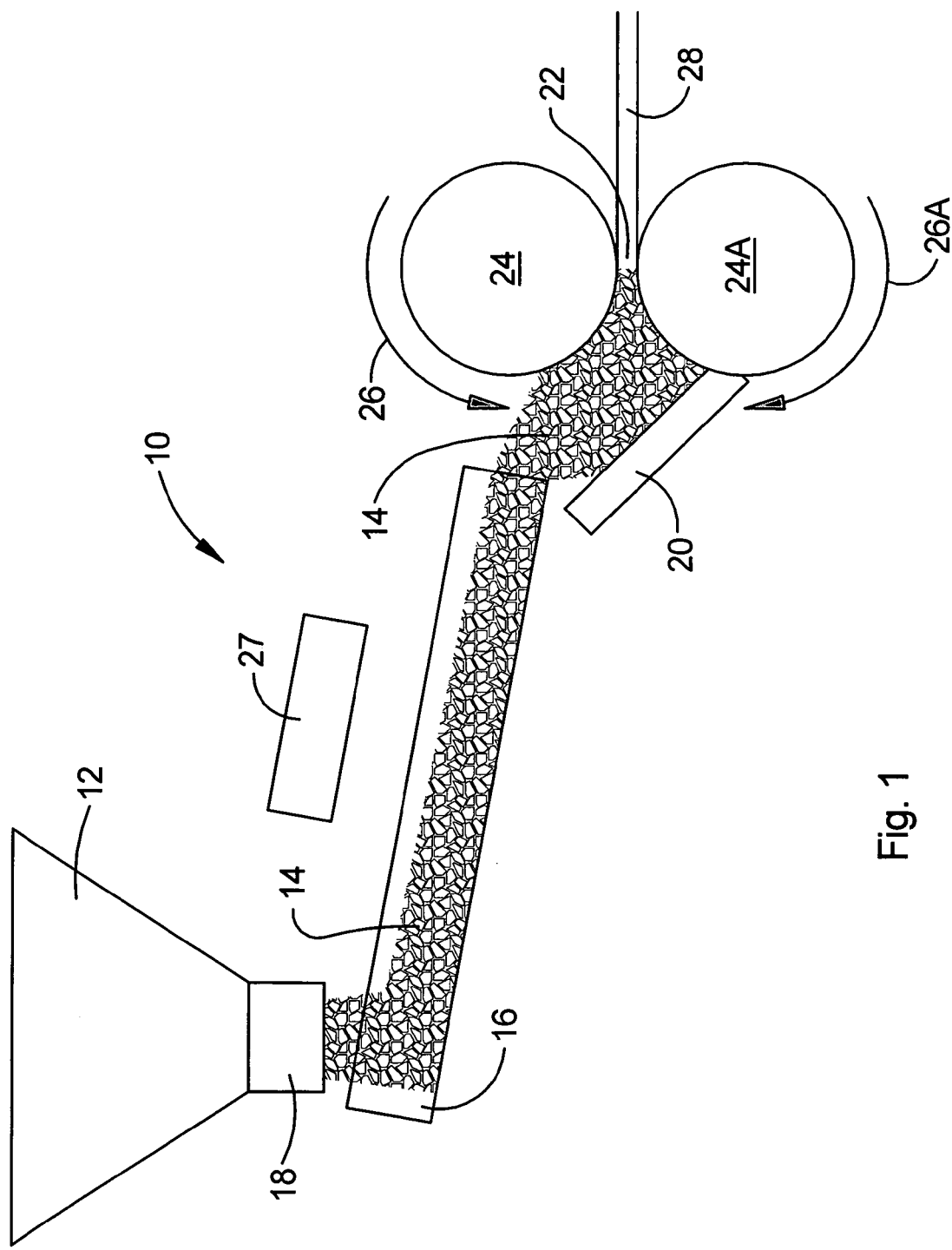
FIG. 1 is a schematic side view of a first apparatus used to produce coherent UHMWPE sheet in accordance with the present invention.

The term "tape", "sheet", "film", or "ribbon" as used herein refers to a non-fibrous, monolithic, polymeric material, homogenous and of rectangular cross-section, of substantially long length, a width on the order of ½-inch or greater, and a thickness substantially less than the width, which implies a high aspect ratio or width-to-thickness ratio. These terms are meant to refer to thin sections of the materials of the present invention in widths up to and exceeding 160 inches in width as could be produced in large commercial equipment specifically designed for production in such widths.

High modulus non-fibrous tape according to the present invention includes a substantially rectangular shape wherein one cross sectional direction of the object is significantly wider than the other cross sectional direction. In general, the tape is thin, preferably 0.0008 to 0.004 inches in thickness, and comparatively wide, ½ inch or greater in width although slitting may subsequently be used to reduce the width after the material has been produced. The aspect ratio of the non-fibrous tapes is very high, at least 125:1 when the width is ½", and the thickness is 0.004" and the aspect ratio may be much higher for example 200,000:1 with a product width of 160" and thickness of 0.0008". Non-fibrous indicates the tape is not comprised of multifilament bundles or small fibers of generally low aspect ratio (10 or less) that have been joined together with a binding matrix, resin, heat, pressure, a combination of these, or any other means in which the material has a starting material that is fibrous (i.e. having, consisting, or resembling fibers). Non-fibrous UHMWPE tape according to the present invention is formed directly from polymer particles without any addition of solvent or exposure to temperatures more than 1° C. above the onset of melting for the particular polymer particle as determined by a differential scanning calorimeter. Unlike fibrous tapes, tapes according to the present invention are not produced by joining elongated members of smaller width.

The term "monolithic" as used herein with respect to the composition of the non-fibrous tape implies that the compositional makeup of the tape is an unchanging structure that does not permit individual variation. In cross-section and throughout its length the tape is not comprised of smaller pieces or sections. The tape is comprised of UHMWPE molecules that are of uniform homogeneous structure. The term "homogeneous" as used herein with respect to the composition of the non-fibrous tape implies that the tape has the same composition throughout, it is of uniform makeup.

The non-fibrous tape of the present invention is produced in two steps which are typically coupled together but may be decoupled and run sequentially. The two steps include rolling the polymer and the second step includes drawing the rolled sheet produced in the rolling process. In the first step of producing tape according to the present invention, polymer is rolled into an orientated sheet with a density above 0.94 g/cc, preferably above 0.945 g/cc, and hereafter referred to as 'rolled sheet' suitable for drawing into a high modulus, highly orientated tape product. In the processing of UHMWPE, it is well known that ultra high molecular weight polyethylene (UHMWPE) with a highly crystalline structure can have a density as high as 0.97 g/cc. During drawing, and depending on process conditions during drawing, microscopic voids in the monolithic tape may form and the apparent density of the tape may fall as low as 0.78 g/cc. Thus, in the rolling and drawing step, it is possible to produce fully drawn UHMWPE "tape" having a density of 0.78 to 0.97 g/cc, although density of the UHMWPE polymer crystalline structure remains at 0.97 g/cc. The descriptions following herein will refer to the product of the rolling portion of the process as "rolled sheet", which is an intermediate, orientated, low modulus material and will refer to the product of the drawing portion of the process as "tape", which is a highly orientated, high modulus (1600-2500 g/d) product.

The term "fiber" as used herein refers to a polymeric material of substantially long length and "narrow" width, i.e. an element substantially narrower than ½-inch, which implies a low aspect ratio, also known as the width-to-thickness ratio. A fiber may be comprised of a homogenous material or may include a plurality or bundle of filaments. The filaments are of substantially narrower cross-section than the fiber. Typically, filaments have an aspect ratio of 10:1 or 1:1. Most typically, a fiber is comprised of filaments with a width substantially equal to their thickness.

The term "fully dense" as used herein in connection with the production of a coherent intermediate UHMWPE sheet by rolling and prior to subsequent drawing is meant to define a UHMWPE sheet that exhibits a density preferably above 0.94 g/cc and more preferably above 0.945 g/cc.

A major difference between the processes of the prior art and the "direct roll process" of the present invention is that the present invention obviates the need for the compaction step and its related high cost entirely while also improving the reliability of the process through the even distribution of polymer powder across and along the formed polymer sheet. Thus, the direct roll processes described herein begins with polyolefin powder introduced as described hereinafter directly into a pair of heated, counter rotating calender rolls under very specific temperature and gap conditions to produce a coherent polyolefin rolled sheet suitable for subsequent further drawing to orient the polyolefin and to produce a high tenacity, high modulus, highly oriented polymeric material useful in forming ballistic-resistant articles or panels.

According to one preferred embodiment of the present invention, the polyolefin processed in accordance with the process of the present invention is preferably ultra high molecular weight polyethylene (UHMWPE) that exhibits high crystallinity, preferably, a specific heat of fusion equal to or greater than 220 joules/gram (J/g) determined by the crystalline melt transition using a differential scanning calorimetry, a crystallinity above 75% as determined as a percentage of the theoretical enthalpy of fusion equivalent to 293 J/g of a 100% crystalline PE, and low entanglement levels of the crystalline morphology. Thus, it is preferred that the input starting material UHMWPE possess a high degree of crystallinity and heat of fusion and that it meets the low entanglement requirements stated above. As defined herein, a high degree of crystallinity refers to a crystallinity of 75% or greater.

Production of a high modulus UHMWPE tape according to the present invention can be performed in two parts, as described herein, or in a single process. Preferably, in order to provide a high and efficient throughput, the invention includes a direct roll process coupled with a subsequent drawing process. In the descriptions herein, the term "total draw" or "total draw ratio" refers to the total amount of elongation of the original polymer particles. Elongation occurs in two steps, rolling and drawing and total draw is equal to the elongation in rolling times the elongation during drawing. Draw may be accomplished in multiple steps, in which case total draw is the product of rolling draw and each individual draw step. The first draw or rolling step, involves elongation of the polymer particles to form a rolled sheet. The elongation or draw amount during rolling is the length of a polymer particle after rolling divided by the particle size prior to rolling. A sheet or web with particles that have been elongated by 2 times is considered as being drawn 2 times. In order to produce a substantially strong finished tape suitable for high modulus applications the rolled sheet draw amount is 4 to 12 times and the most preferred draw amount in rolling is 5 to 9 times. Thus, this implies that most preferably the UHMWPE particles are elongated or lengthened 5 to 9 times their original length during rolling. A rolled sheet with elongations of 9 will exhibit a much higher degree of orientation compared to a sheet with an elongation of 2. As an example, for a sheet rolled to an elongation of 6 and further drawn 20 times in the drawing step, the total draw is 6*20 or 120, while an elongation of the initial rolled sheet of 9 that is drawn 20 times will have a total draw of 180 although it is possible to achieve higher post draws on an orientated rolled tape with a rolled draw of 9 or above. Typical post draw ranges for the oriented tape are 18 to 25 when the rolling draw is 5 to 9. While it is possible to obtain suitable properties for some applications, for production of the high modulus UHMWPE according to the current invention, the total draw, also known as total draw ratio, is preferably above 100 and may be as high as 180 or higher depending on the polymer molecular weight, crystallinity, and degree of entanglement of the crystal structures. Orientation and modulus of the UHMWPE tape increases as the total draw or draw ratio increases. The term "highly oriented" tape as used herein refers to polyolefin tape drawn to a total draw ratio of 100 or greater, which implies that the polymer particles within the tape have been stretched in a single direction 100 times their original size. During drawing of UHMWPE according to the present invention, several properties including length, material orientation, physical tensile properties such as strength and modulus, heat of fusion, and melt temperature will typically increase. Elongation, thickness and width will typically decrease.

The term "UHMWPE" or "UHMWPE powder" as used herein refers to the polymer used in the process according to this invention. The UHMWPE powder preferably has a crystallinity of at least 75% as determined by differential scanning calorimeter (DSC), and more preferably at least 76%. Molecular weight is at least 2,000,000 and more preferably greater than 4,000,000. The polymer is preferably not exposed to more than 1° C. above the onset of melt determined by DSC and preferably is maintained below the onset of melt during formation of the rolled sheet. It is critical the crystalline structures have low entanglement. Low entanglement allows the polymer particles to elongate during rolling and drawing to the high total draws required to obtain the high modulus of this invention. Such commercially available polymers as GUR-168 from Ticona Engineering Polymers and Mitsui 540RU from Mitsui Chemicals can be used to obtain the very high modulus tape of this invention. Both these polymers have an onset of melt between 135.5 to 137° C. Low entanglement as used herein refers to the ability of the polymer crystalline structure as used in the UHMWPE tape of the present invention, to easily stretch to high draw ratios while being pulled or stretched. Polymers with highly entangled crystalline structures do not have the ability to be stretched easily without damage and resulting loss of properties and polymers with a high amorphous content (lack of high crystallinity) cannot develop the required properties. Many classes of UHMWPE polymers are highly amorphous and have low crystallinity. The percentage crystallinity can be determined using a differential scanning calorimeter (DSC).

The term "denier" is a common textile term referring to the weight in grams for a 9000 meter length of material. Cross-sectional dimensions are not considered in this term. A common method of determining denier is by cutting a 9 meter length of the material, determining the sample weight in grams, and multiplying the obtained weight by 1000. Tape produced according to this invention will have a denier of 3000 at ½" width and 0.001" in thickness while the denier will be 670,000 for tape 30 inches in width and 0.004 inch in thickness.

Referring now to the accompanying drawings, as depicted in FIG. 1, there is shown a preferred embodiment of a direct roll process for completing the rolling step in producing a high modulus UHMWPE tape according to the present invention. The initial step in the production of a high modulus UHMWPE tape utilizes a direct roll apparatus 10 comprising a polymer powder hopper 12 that feeds a metered amount of polymer powder 14 into a vibratory chute 16 via a metering device 18 and thence to a containment plate 20. At containment plate 20 the powder is introduced into the gap or nip 22 between two counter rotating heated calender rolls 24 and 24A rotating in the directions shown by arrows 26 and 26A. A heater 27, preferably an infrared heater, imparts heat to powder 14 as described more fully below. Heater 27 is preferably located from 2 to 8 inches above powder 14 in vibratory chute 16 and set at a temperature of between 160 and 220° F. Too high a temperature will cause sticking and poor flow between polymer particles while insufficient heat may cause low densities in the rolled sheet 28 and subsequent low modulus in the tape product. Amount of heat applied is also dependent on the dwell time of the polymer in contact with heated rolls 24 and 24A. These distances and temperatures will, of course, be variable depending upon the particular polymer powder 14 being processed, and the type of heater used, but has been found suitable for the processing of the preferred UHMWPE. Additional heat may be applied by heating the vibratory chute 16 and/or the containment plate 20. As powder 14 cascades down vibratory chute 16 onto containment plate 20 it builds to a point where it is drawn into gap 22.

The successful practice of this embodiment of the present invention requires the delivery of sufficient polymer into the nip such that the rolled sheet 28 has a density above 0.94 and more preferably above 0.945 g/cc. Insufficient polymer in the nip area will result in low density of the rolled sheet and a modulus below 1600 g/d in the fully drawn tape product.

Sufficient quantity can be monitored by measuring pressures developed in the roll loading. As the polymer builds up in the nip, forces attempting to push the rolls apart will increase. The mechanical or hydraulic forces loading the rolls together must be sufficient to maintain the gap to produce the desired rolled sheet thickness with the required density and orientation. To standardize the forces for varying web widths, forces are generally considered in terms of a unit length of the product under pressure. For instance, a separation or nip force of 16,000 pounds across a web width of 8" is a loading of 2000 pounds per linear inch (PLI Due to the non-linear nature of the process (that of converting a low bulk density polymer into a high density orientated tape), it is difficult to precisely determine the unit force of pressure in the nip area, but for rolls in the range of 9-16 inches in diameter, it is thought that the highest pressures near the web exit (22) are about 2500-8000 PSI although it is more likely in the range of 3000 to 6000 PSI. Pressure alone does not make this conversion since it also requires the frictional shearing action to elongate and orientate the material into a homogenous, coherent sheet. As used herein, the term "coherent sheet" is meant to define a rolled polymer sheet that is suitable for further processing by drawing without tearing, ripping or otherwise becoming unusable in such additional processing. For all practical purposes, such a sheet will be virtually fully dense such as in the case of the preferred UHMWPE materials described herein having a density above 0.945 g/cc. For the preferred UHMWPE powders 14 described elsewhere herein the operating temperature, which refers to the temperature after formation of a coherent sheet 28, is preferably in the range of from 16° C. below to about 6° C. above the onset of melt and more preferably between 8° C. below to 3° C. above the onset of melt and most preferably between 6° C. below to 1° C. above the onset of melt, and the rolled sheet thickness is between 0.002 inches (50 μ) and 0.0138 inches (350 μ) and preferably between 0.0039 inches (100μ) and 0.0123 inches (312 μ) with a density above 0.945 g/cc. It should be noted that the initial temperature and operating temperatures recited herein are not necessarily set points for the polymer powder/sheet in nip 22, but rather refer to the surface temperatures of heated calender rolls 24 and 24A. Temperatures selected are dependent on generated roll forces. It is probable that temperatures below the stated range are possible at even higher PLI pressures than those studied. Increasing the roll diameter will typically require increased PLI loading. Increasing the PLI loading for a given diameter will decrease the temperature required to obtain rolled sheet densities suitable for drawing to a modulus greater than 1600 g/d. The critical determination is the rolled sheet density must be above 0.945 g/cc and preferably above 0.95 g/cc and the polymer must not be exposed to a temperature greater than 1° C. above the onset of melt of the feed polymer prior to the formation of the rolled sheet.

While the operating speed of the apparatus just described will vary with the particular polyolefin being processed, using the preferred UHMWPE materials described above, roll speeds of between 0.5 to 4.0 meters per minute have been tested and found acceptable. It should be noted that these operating speeds may be lower or higher and higher speeds will depend on the ability to provide polymer into the nip at the correct temperature at the instant of changing from a discrete polymer particle into a rolled coherent and orientated sheet of sufficient density. Larger roll sizes provide additional dwell time for polymer heating and should thus provide higher throughput. The product of the just described rolling process is a virtually full dense and translucent UHMWPE rolled sheet having a density of 0.945 to 0.97 g/cc.

While the apparatus used to practice the rolling step in the process of the present invention is depicted herein as horizontally oriented (see FIG. 3), the process will operate equally well with a vertical configuration, i.e. with the polymer powder being fed to gap 22 between two vertically stacked calender rolls 24 and 24A. In this alternative orientation (see FIG. 1), powder 14 is metered from a heated hopper located above horizontally parallel calender rolls 24 and 24A so that powder 14 is fed from above into gap 22 and the product sheet 28 is drawn from below gap 22. All other operating procedures, i.e. temperature control and gap setting variations remain the same.

While not critical to the successful practice of the present invention, and clearly variable depending upon the particular polyolefin being processed, a roll surface roughness of less than 20 Ra and more preferably less than 10 Ra and most preferably less than 4 Ra on each of the two rolls has been found suitable for the processing of the preferred UHMWPE materials described herein, where Ra is the arithmetic average of the absolute values, expressed in units of height in "millionths" of an inch, sometimes referred to as "microinches". (Degarmo, E. Paul; Black, J T.; Kohser, Ronald A. (2003), *Materials and Processes in Manufacturing* (9th ed.), Wiley, p. 223)

Referring now to accompanying FIG. 3 that depicts a schematic side view of a second and preferred embodiment of a direct roll apparatus 70 useful in the successful production of a high modulus UHMWPE tape according to the present invention, rolls 24 and 24A according to this embodiment are oriented horizontally as opposed to vertically as previously described in connection with FIG. 1. As used in the description that follows, the following terms indicated by the reference numerals shown in FIG. 3 have the following meanings and purposes: doctor blade gap 74 controls the amount of polymer laid on rolls 24 and 24A and finally introduced into the nip 76. For the horizontal roll arrangement shown in FIG. 3, the mass of polymer laid on the rolls must equal the mass that exits nip 76 as a rolled sheet. Roll nip or roll gap 76 is the closest distance between opposing rolls 24 and 24A and this gap distance and the pressure exerted by the rolls at this gap are the main parameters that control rolled sheet thickness and density. Because the sheet is formed by elongating and bonding the particles together and not by simply compressing the feed material as is normally associated with web and calender processes, the resulting rolled sheet 28 thickness will normally exceed the gap measurement as the elongated particles are stretched, pulled through the gap by the roll surface, and slightly contract and expand as forces are released. Roll nip reservoir 78 is the small reservoir of polymer that sits just above roll nip 76. In the horizontal arrangement of FIG. 3, the polymer touches both rolls and is brought into the nip by friction and compression from both rolls, while in the vertical arrangement previously described and shown in FIG. 1, the material is slightly self regulating since it can rest mainly on roll 24A and fall back out of nip 76 if too much powder is present.

Figure 3:
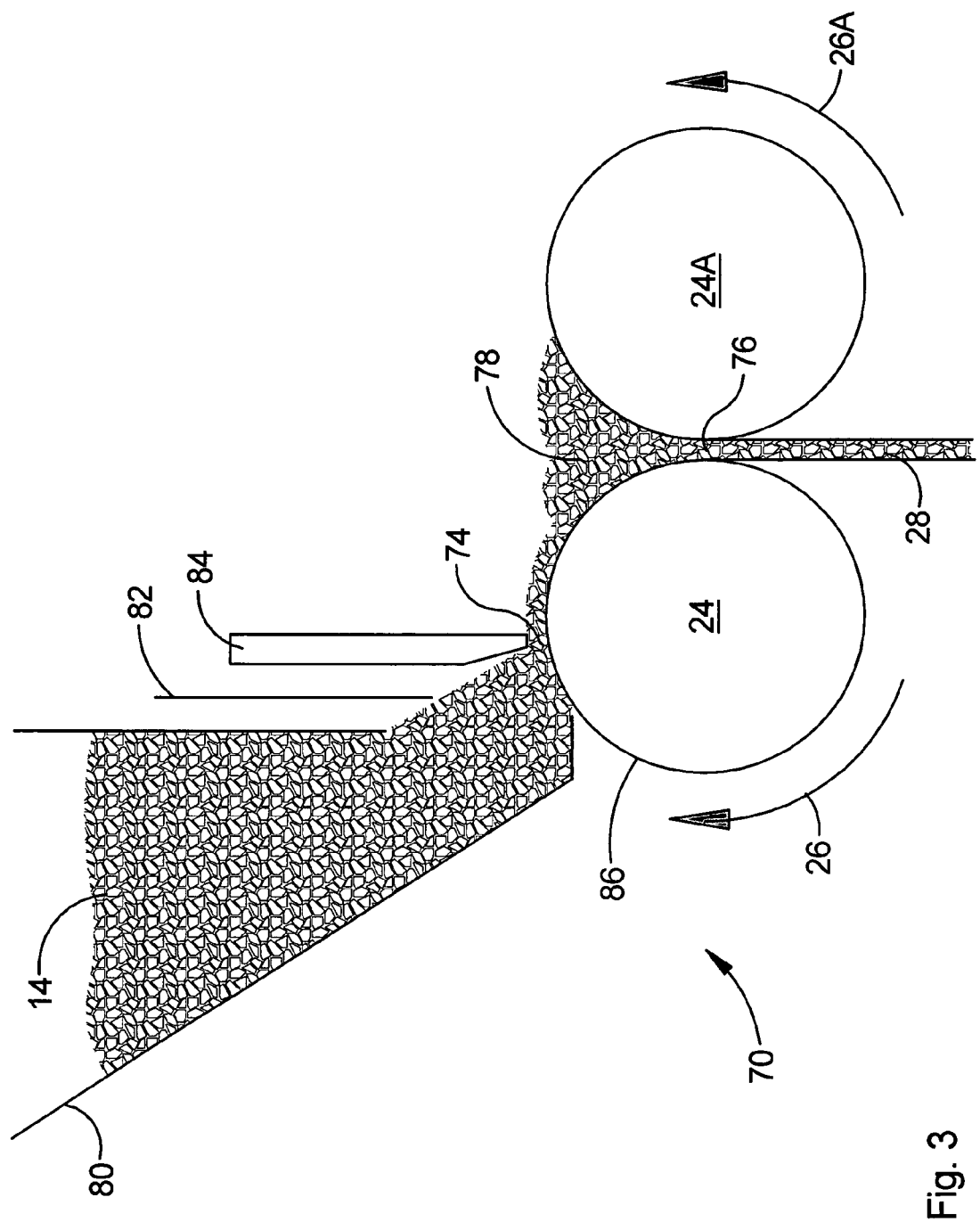
FIG. 3 is a schematic side view of an alternative apparatus used to produce coherent UHMWPE sheet in accordance with an alternative embodiment of the present invention.

In accordance with the embodiment depicted in FIG. 3, polymer 14 is supplied from a hopper 80 that includes a hopper gate 82 that helps to control the flow of polymer 14 from hopper 80. Since, as described below, heating of polymer 14 takes place as polymer 14 contacts and is rotated on periphery 86 of roll 24, it is preferred that hopper 80 not be heated, although some small amount of heat can be imparted to polymer 14 while it is resident in hopper 80 and such imparting of minimal amounts of heat, i.e. at temperatures significantly below the melting point of polymer 14 should be considered as within the meaning of the term "unheated" as used to describe hopper 80 in the appended claims. A doctor blade 84 regulates the flow of polymer 14 from hopper 80 onto roll 24 wherefrom it is transported about the periphery 86 of roll 24 into roll nip reservoir 78. It is preferred, but not absolutely necessary, that doctor blade 84 be vibrated. The setting of doctor blade 84 may be determined by sensors (not shown) that detect the amount of powder in the roll nip reservoir 78, the presence and amount of powder, if any, at the horizontal extremes of roll nip reservoir 78, the force between the rolls, and the rolled sheet density and thickness. The critical result is a consistent rolled sheet of the desired thickness, density, and orientation. Variations in the polymer, polymer reservoir, nip pressure, roll temperatures, and gap distance all play an important role in determining the characteristics of the rolled sheet and as such it is desirable to control these parameters. The design, fabrication and operation of such devices are well within the skills of the skilled artisan and, accordingly, are not described in detail herein. Coherent rolled sheet, tape, ribbon, film or fiber 28 emerges from roll nip 76 as in the case of the "vertical" process described above.

In order to better understand the operation of the apparatus just described, it is important to understand the role and the operation of doctor blade 84. The doctor blade gap 74 controls the amount of polymer 14 delivered to the roll nip 76 via the rotation of roll 24. Roll nip gap 76 controls the amount of polymer 14 removed from roll nip reservoir 78 and roll nip pressure along with polymer temperature determine the density of the removed material in rolled sheet form Roll nip reservoir 78 acts not only as a filter to maintain this balance, but also serves as a means of providing material into roll nip gap 76. If polymer 14 is delivered from doctor blade gap 74 at a higher rate than it is removed, roll nip reservoir 78 will overflow or become so large that the pressure in roll nip 76 will open roll nip 76, break a mechanical component, or stall the motor. If polymer 14 exits roll nip reservoir 78 faster than it is fed in, the rolled sheet will have insufficient polymer and undesirably have low density or voids.

Doctor blade gap 74 and the roll speed control the quantity of polymer 14 delivered to nip 76. The polymer laydown on roll 24 does not need to be as uniform as required by the prior art compaction process due to the presence of roll nip reservoir 78. Thus, roll nip reservoir 78 serves as a small quantity reservoir to reduce the peaks and valleys in the distribution of the polymer laterally (the length wise direction or across the roll face) and directionally (in the direction of roll rotation) to allow polymer 14 to distribute evenly to a small extent.

Similarly, it is important to fully understand the function of roll nip reservoir 78. For a given roll gap 76 and pressure exerted between the rolls and onto the rolled product, the product thickness will remain within a fairly narrow range. The height of roll nip reservoir 78 above roll nip 76 determines how much of polymer 14 is in contact with rolls 24 and 24A and the diameter of rolls 24 and 24A also play a function. As rolls 24 and 24A rotate, polymer 14 is brought closer to roll nip 76 and the density of polymer 14 is increased with air or void removal as it approaches roll nip 76 until at some point the polymer particles are flattened, bond together under the very high pressure, and are sheared and lengthened (elongated) in the direction of roll rotation allowing the elongated coherent material to exit the small gap 76. Polymer is not densified in the normal sense of calendering but more similar to rolling, the material becomes longer and thus thinner. If the volume of polymer 14 in roll nip reservoir 78 is higher, polymer 14 entry into nip 76 becomes sufficiently high to exert higher pressures and resulting higher densities until at a certain limit the gap is forced open or insufficient polymer exits nip 76 and the nip reservoir increases to overflowing. If the amount of polymer 14 in roll nip reservoir 78 is too small, polymer 14 is brought into roll nip 76 but insufficient densities occur at nip 76 resulting in reduced pressures and production of a rolled sheet 28 with undesirable densities below 0.94 g/cc.

While the size (diameter), finish and speed of rolls 24 and 24A can vary broadly, certain parameters for these elements have been found to be particularly useful in the successful practice of this embodiment of the present invention. Rolls of 9 and 16 inches in diameter have been found particularly useful, but rolls of larger and smaller diameters can be used providing certain minimum pressures are maintained in roll gap 76. With larger rolls increased speeds are possible due to the longer contact time between the roll and polymer 14 as it rotates in contact with periphery 86 but more pressure in PLI is also required. For rolls 15 inches in diameter, speeds of from 1 to 12 m/min are possible while rotation speeds of between 0.5 to 4 m/min have been found satisfactory with roll rotation speeds of 1.5-2.3 meters per minute producing highly desirable results with the particular UHMWPE materials being processed.

Roll surfaces must be hard and possess good wear and abrasion characteristics with a hard chrome surface found very suitable for this process. The surfaces should be consistently smooth to provide consistent movement of the polymer into roll nip 76. Chrome surfaces in the below 4 Ra range are preferred. Markings and discoloration of the surfaces have an impact on process performance. If the roll surface shows discoloration, more or less heat transfer occurs. This can leave a minor mark on the product and at worse a weak spot. Indentations, grooves, or protrusions will create weak spots in the rolled sheet and finished tape.

In the vertical roll process described hereinabove, certain start-up parameters may be desirable as this arrangement requires that polymer be lifted in sufficient quantities into the roll gap. This may require starting at elevated temperatures or at a reduced gap until a coherent sheet is established, but, depending upon the polymer material being processed, may not be absolutely necessary. According to one preferred embodiment, it is preferred that at start up the rolls be heated to a temperature of from 1 to 5 degrees above the melting point of the polymer being processed and the roll gap be set at from 20 to 50 microns smaller than the operating roll gaps suggested above. Under operating conditions, for the processing of UHMWPE, the roll temperatures should be in the range of from 130° C. to 150° C., preferably in the range of from 132° C. to 143° C., and most preferably between 136° C. and 140° C. While these startup conditions are preferred for certain of the UHMWPE materials discussed herein, they are not critical and in many instances the gap and temperature requirements at start up are similar to those used during operation. For example, in certain cases, operating temperatures of between 130° C. and 146° C. will be satisfactory with narrower temperature ranges of from 136.5° C. to 142° C. desirable at roll speeds of between 1 and 4 meters per minute. Roll gaps at start up will generally be about the same as those used under operating conditions, i.e. between 0.015 and 0.35 mm using the materials and conditions described herein. For the horizontal rolls, the startup requirements are less stringent since polymer rotates into the reservoir at any temperature setting and the only requirement is to close the gap sufficiently with sufficient force to produce a coherent sheet. From this point doctor blade gap 74, roll temperature, roll force, and gap measurement are balanced to deliver the rolled sheet of the preferred thickness, orientation, and density. Successful practice of the rolling process-described herein is not limited to the specific narrow start up and operating conditions described hereinabove as these will vary widely depending upon the material being processed, the desired product sheet thickness, the roll temperature, the roll speed, the roll size, and the roll finish.

Figure 2:
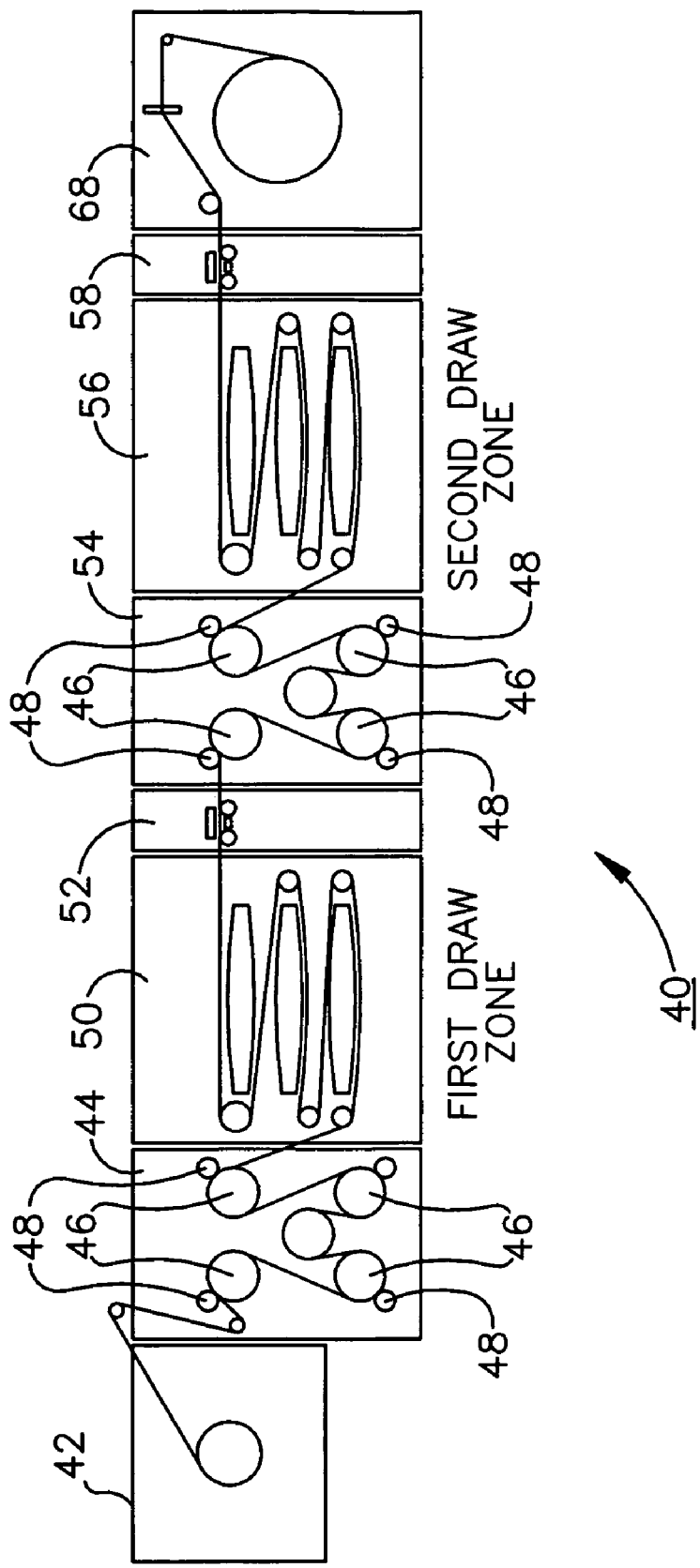
FIG. 2 is a schematic diagram of a preferred embodiment of the apparatus used to implement the drawing portion of the preferred process of the present invention.

Referring now to FIG. 2, there is shown a drawing apparatus 40 that is typically coupled to the direct rolling process of FIG. 1 or 3 to achieve further orientation, width and thickness reduction with subsequent modulus and strength increase of the coherent rolled sheet. The drawing apparatus comprises: a payoff 42 or a direct feed of coherent rolled sheet from the rolling process of FIG. 1 or 3, a godet stand 44 possibly including heated godet rolls 46 and nip rolls 48 for establishing and maintaining tension in the line, a first draw zone 50, a first in-line tension sensor 52, a second godet stand 54 possibly including heated godet rolls 46, a second draw zone 56, a second in-line tension sensor 58, and unheated take-up rolls on winder 68. In the preferred coupled process of the present invention, payoff 42 is replaced with one of the devices shown in FIG. 1 or 3 feeding coherent rolled sheet directly into godet stand 44, thus the input or starting material to the drawing step described below is coherent rolled sheet 28 that emerges from gap 22 in the process described above.

Maintaining a constant tension of between 0.5 and 6.0 g/denier, and more preferably between 0.8 and 4.5 g/denier during drawing is also important to the production of product having the required thickness and enhanced properties specified herein. At tension levels below 0.5 g/denier drawing will occur, but the enhanced properties discussed above will not be fully achieved. Conversely, at tension levels above 6 g/denier the material properties will deteriorate as mechanical damage or separation occurs in the material instead of lengthening by elongation of the original particles. In the case of drawing, tension is a function of the feed polymer and prior processing conditions and can vary broadly depending thereon and the ranges just specified refer to those found useful with particular preferred UHMWPE commercial starting materials. In general, higher polymer molecular weight, higher entanglement in the crystalline morphology, and higher exposures to temperature and or pressures during processing will require higher tensions in drawing and possibly higher drawing temperatures to achieve the desired amount of drawing to produce a high modulus UHMWPE tape according to the present invention.

According to a highly preferred embodiment of the present invention, drawing is performed in line with direct rolling as described hereinabove. In such a continuous process, calender rolls 24 and 24A become payoff 42 of drawing apparatus 40. Such an arrangement provides a highly efficient method for practicing the novel production process of the present invention.

After thickness and width reduction by drawing in the apparatus shown in FIG. 2 in accordance with the processing parameters described hereinabove, the UHMWPE films, sheets, fibers or tapes thus produced exhibit heats of fusion at or above 243 joules/gram, tenacities in the range of 22 to 29 g/d, tensile modulus between 1600 and 2500 g/d and elongations in the range of from 1.6 to 3.0 percent.

EXAMPLES

Example 1

Preparation of UHMWPE Tape by Compression Molding Followed by Multiple Calender Stacks UHMWPE polymer having a molecular weight of 5,500,000, a crystallinity of 77-78% as determined by DSC, and a specific heat of fusion of 227 Joules/gram was first compression molded and then rolled in a multiple calender stacks in a process similar to that described in commonly owned U.S. Pat. No. 7,740,779, which is incorporated herein by reference in its entirety. The UHMWPE polymer was compressed into a friable sheet at temperatures below the onset of melt, calendered to form a rolled and orientated sheet with a density of 0.91 g/cc and a rolling draw of 6 to 7, additionally drawn 20 times to a total draw of 120-140 times. Calender roll surface temperatures were operated between 135.5 and 138° C., below the onset of melt for the UHMW PE polymer. Calender pressures averaged 1200 to 2000 pounds per linear inch (PLI). After rolling to form an orientated coherent sheet, the material was drawn at temperatures near the melt temperature of the orientated sheet. Temperature was varied to a small degree to maintain tension that was tightly controlled between 0.5 to 5.0 grams/denier during the draw process to increase the modulus. The resultant fully drawn tapes were over ½" in width. Narrow strips of 0.03 to 0.15" were slit from the wider strips and tested with a tensile tester to determine modulus, elongation, and tenacity. Modulus was determined for multiple samples A to D of the resulting product and is listed under Example 1 in Table 1 herein below. The "Highest Result Modulus", listed in Column 3 of Table 1, is the result of a single test of that sample while the "Average Result Modulus", listed in Column 4 of Table 1, is the average of at least 5 tests and as many as 12 single results.

Example 2

Preparation of UHMWPE Tape by a Direct Roll Process Followed by Drawing

UHMWPE polymer having a molecular weight of 5,100,000, a crystallinity of 77-78% as determined by DSC, and a specific heat of fusion of 227 Joules/gram was processed into a coherent sheet in a direct roll apparatus (see FIG. 3) and then drawn to several times its length in a drawing apparatus (see FIG. 2). The UHMWPE polymer was metered onto a heated roll and rotated into a nip point where an opposing roll, using heat and pressure, elongated the polymer particles and bonded them into a nearly fully dense orientated rolled sheet of product (see FIG. 3). The heated roll surface temperatures were operated between 135 and 137° C., below the onset of melt for the UHMWPE polymer. The calender pressure at the nip was maintained between 1700 to 2300 PLI. The resulting rolled sheet of product with a density of 0.935 g/cc and a rolling draw of 6 to 7, was further drawn 20 to 21.5 times at temperatures near the melt temperature of the orientated sheet to a total draw of 120 to 150 times in a drawing apparatus (see FIG. 2), producing a highly orientated tape having a high modulus. Temperature was varied to a small degree to maintain tension that was controlled at 0.5 to 5.0 grams/denier during the draw process. The resultant fully drawn tapes were over ½" in width. Narrow strips of 0.03 to 0.15" were slit from the wider strips and tested with a tensile tester to determine modulus, elongation, and tenacity. Modulus was determined for multiple samples A to D of the resulting product and the highest modulus result and the average modulus result are listed under Example 2 in Table 1.

Example 3

Preparation of UHMWPE Tape by a Direct Roll Process Followed by Drawing

UHMWPE polymer having a molecular weight of 5,100,000 and 5,500,00, a crystallinity of 76-78% as determined by DSC, and a specific heat of fusion of 223-228 Joules/gram was processed into a coherent sheet in a direct roll apparatus (see FIG. 3) and then drawn to several times its length in a drawing apparatus (see FIG. 2). The UHMWPE polymer was metered onto a heated roll and rotated into a nip point where an opposing roll, using heat and pressure elongated the polymer particles and bonds them into a nearly fully dense orientated rolled sheet of product (see FIG. 3). The heated roll surface temperatures were operated between 132 and 137° C., a range that is below the onset of melt for the UHMWPE polymer to 1 degree above the onset of melt. The calender pressure at the nip was varied between 2500 and 4000 PLI for the resulting samples. The resulting nearly fully dense rolled sheet with a density of 0.945 g/cc and with a rolling draw of 6 was further drawn at temperatures near the melt temperature of the orientated sheet 20 times to a total draw of 120 times in a drawing apparatus (see FIG. 2), producing a highly orientated tape having a high modulus. Tension was controlled at 0.5 to 6.0 grams/denier during the draw process. While the fully drawn tapes were over ½" in width, and in many cases several inches or more in width, it is impractical to test such wide tapes. Narrow strips of 0.03 to 0.15" were slit from the wider strips and tested with a tensile tester to determine modulus, elongation, and tenacity. Modulus was determined for multiple samples A to F of the resulting product and the highest modulus result and the average modulus result are listed under Example 3 in Table 1.

TABLE 1

| Example | Sample | Highest Result Modulus g/d | Average Result Modulus g/d |
|---|---|---|---|
| 1 | A | 1627 | 1523 |
| 1 | B | 1558 | 1402 |
| 1 | C | 1493 | 1414 |
| 1 | D | 1394 | 1351 |
| Average Example 1 | | 1518 | 1423 |
| 2 | A | 1569 | 1455 |
| 2 | B | 1628 | 1433 |
| 2 | C | 1645 | 1498 |
| 2 | D | 1585 | 1442 |
| Average Example 2 | | 1607 | 1457 |
| 3 | A | 2472 | 1798 |
| 3 | B | 2231 | 1992 |
| 3 | C | 2543 | 1852 |
| 3 | D | 2010 | 1899 |
| 3 | E | 2047 | 1897 |
| 3 | F | 2026 | 1851 |
| Average Example 3 | | 2222 | 1882 |

Highest result indicates results from a single test of that process condition.
Average result is the average for the selected process condition.

Highest result indicates results from a single test of that process condition. Average result is the average for the selected process condition.

As shown by the results presented hereinabove in Table 1, unexpected results were obtained by applying the direct roll process of FIG. 3 followed by the drawing process of FIG. 2. Thus it is shown that UHMWPE polymer having a molecular weight of 5,400,000 to 5,500,000, a crystallinity of at least 75% as determined by DSC, and a heat of fusion of greater than 220 Joules/gram, can be processed in a direct roll process with a nip pressure between 2500 and 4000 PLI, roll surface temperatures between 132-137° C. and the resulting rolled sheet of product further drawn at temperatures near the melt temperature of the orientated sheet under controlled tensions between 0.5 to 6.0 g/d to a total draw of 120 times in a drawing apparatus (see FIG. 2) to produce a highly orientated tape having a modulus of 1600 to 2500 grams per denier. It has also been shown that narrow tapes under ½" in width maintain these properties when slit from the wider tape products.

As the invention has been described, it will be apparent to those skilled in the art that the same may be varied in many ways without departing from the spirit and scope of the invention. Any and all such modifications are intended to be included within the scope of the appended claims.

What is claimed is:

1. A monolithic non-fibrous ultra high molecular weight polyethylene tape usable in ballistic resistant panels comprising:
    ultra high molecular weight polyethylene (UHMWPE) having a viscosity-average molecular weight of 2,000,000 or greater;
    a thickness of between 0.0008 and 0.004 inch;
    a width of ½ inch or greater; and
    a modulus of 1600 to 2500 grams per denier.

2. The UHMWPE tape of claim 1 wherein said ultra high molecular weight polyethylene tape includes a total draw ratio of from 100:1 to 180:1.

3. The UHMWPE tape of claim 1 wherein said tape has a denier of from 3,000 to 670,000.

4. The UHMWPE tape of claim 1 wherein said tape is formed from ultra high molecular weight polyethylene powder having
    a crystallinity of at least 75% as determined by X-ray diffraction; and
    a specific heat of fusion of greater than 220 joules/gram as determined by differential scanning calorimeter.

5. The UHMWPE tape of claim 1 wherein said tape includes a width to thickness ratio of at least 125:1.

6. The UHMWPE tape of claim 1 wherein said tape includes a density of 0.78 to 0.97 g/cm$^3$.

7. The UHMWPE tape of claim 1 wherein said tape has a width of from 0.5 to 160 inches.

8. The UHMWPE tape of claim 1 wherein said tape includes a width to thickness ratio of from 125:1 to 200000:1.

9. The UHMWPE tape of claim 1 wherein said polymer has a viscosity-average molecular weight above 4,000,000.

10. The UHMWPE tape of claim 1 wherein said tape has an elongation to break between 1.6 to 3%.

11. The UHMWPE tape of claim 1 wherein said tape forms all or a portion of a ballistic-resistant article.

* * * * *